US007801891B2

(12) United States Patent
Hu et al.

(10) Patent No.: US 7,801,891 B2
(45) Date of Patent: Sep. 21, 2010

(54) SYSTEM AND METHOD FOR COLLECTING USER INTEREST DATA

(75) Inventors: Lixin Hu, Shenzhen (CN); Jieping Zhong, Shenzhen (CN); Qi Shu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 11/684,839

(22) Filed: Mar. 12, 2007

(65) Prior Publication Data
US 2007/0271519 A1 Nov. 22, 2007

(30) Foreign Application Priority Data
May 19, 2006 (CN) .................. 2006 1 0081023

(51) Int. Cl.
G06F 7/00 (2006.01)
G06F 17/30 (2006.01)
G06Q 30/00 (2006.01)

(52) U.S. Cl. .................. 707/734; 707/750; 707/804; 705/10; 705/14.53; 705/14.66

(58) Field of Classification Search .................. 707/101, 707/9, 734, 750, 804; 715/745; 705/10, 705/14.53, 14.66
See application file for complete search history.

(56) References Cited

U.S. PATENT DOCUMENTS

| 7,213,027 | B1 * | 5/2007 | Kominek et ................ 707/102 |
| 7,451,065 | B2 * | 11/2008 | Pednault et al. ................ 703/2 |
| 7,487,164 | B2 * | 2/2009 | Saito et al. ................... 707/100 |
| 2002/0087632 | A1 * | 7/2002 | Keskar ........................ 709/204 |
| 2003/0090515 | A1 * | 5/2003 | Chang et al. ................. 345/745 |
| 2003/0160820 | A1 * | 8/2003 | Marshall ...................... 345/745 |
| 2004/0141003 | A1 * | 7/2004 | Nivers et al. ................. 345/745 |
| 2004/0172415 | A1 * | 9/2004 | Messina et al. ........... 707/104.1 |
| 2005/0222989 | A1 * | 10/2005 | Haveliwala et al. ............ 707/3 |
| 2006/0048060 | A1 * | 3/2006 | Mohr et al. .................. 715/747 |
| 2006/0107219 | A1 * | 5/2006 | Ahya et al. .................. 715/745 |
| 2006/0230053 | A1 * | 10/2006 | Eldering ...................... 707/101 |
| 2007/0057345 | A1 * | 3/2007 | Sasaki ......................... 257/536 |
| 2007/0067345 | A1 * | 3/2007 | Li et al. .................... 707/104.1 |
| 2007/0156677 | A1 * | 7/2007 | Szabo ........................... 707/5 |
| 2007/0260624 | A1 * | 11/2007 | Chung et al. ................. 707/101 |
| 2007/0300161 | A1 * | 12/2007 | Bhatia et al. ................. 715/745 |

FOREIGN PATENT DOCUMENTS

DE 102005051617 B4 * 10/2009
WO WO 2006/000640 1/2006

* cited by examiner

Primary Examiner—Jean B. Fleurantin
Assistant Examiner—Mark E Hershley
(74) Attorney, Agent, or Firm—Marshall, Gerstein & Borun LLP

(57) ABSTRACT

A method for collecting user data includes: collecting content of a user action event; modifying a user interest data model which stores user interest data according to the content of the user action event collected. In this way, the interest and concerns of the user are effectively tracked. Furthermore, the method and system provided by embodiments of the invention features little disturbance to user and accurate collection of user information, thus effectively shows the interest of user. Through method and system provided by embodiments of the invention, the user data can be collected effectively and the interest of the user is well represented.

14 Claims, 3 Drawing Sheets

# SYSTEM AND METHOD FOR COLLECTING USER INTEREST DATA

CROSS-REFERENCE TO RELATED APPLICATION

The priority benefit of Chinese Patent Application No. 200610080l023.5 filed May 19, 2006, the entire disclosure of which is hereby incorporated herein by reference, is claimed.

BACKGROUND OF THE INVENTION

1. Field of the Invention

The invention relates to intelligent application services, and particularly, to a system and a method for collecting user data.

2. Background of the Invention

Information industry is in a time of great changes and rapid development; the whole industry will inevitably go through stages of access-oriented, service-oriented and user-oriented. Telecommunication operators and Internet companies are competing intensely to absorb users; varieties of wireless value-added services and Internet value-added services are occupying more and more proportions in the profits of these companies and attach crucial strategic importance to the categorization of users. Scientific categorization may provide definite objects for companies in marketing and provide customized products and services for the users, therefore operators may raise service level while improving users' experience.

It is important to collect user data, build user data models, and finds out potential demands of the user in order to raise service level. User data are the key to the habit and interest of the user. Only the user data is obtained, better services may be provided to the user.

In order to acquire the interest of the user, a network browser usually obtains the user data through the following four ways:

1. Make a statistic of the Uniform Resource Locator (URL) addresses of the websites that the user has visited;
2. Analyze data in a Favorite folder or a Web Cache of the user;
3. Inquire the user initiatively by a server, e.g., via questionnaires;
4. Analyze log data of a web server.

All of the foregoing methods for acquiring user interest require participation of the user, which greatly annoys the user; moreover, the user interest collected may be incomplete, inaccurate and incapable of tracking the shift of interest and concerns of the user.

SUMMARY OF THE INVENTION

An embodiment of the invention provides a system for collecting user data effectively.

Another embodiment of the invention provides a method for collecting user data effectively.

According to an embodiment of the invention, the method for collecting user data includes:

collecting content of a user action event;

modifying a user interest data model which stores user interest data according to the content of the user action event collected.

Another embodiment of the invention provides a system for collecting user data, includes:

a user database, configured to store a user interest data model;

an information collection agent, configured to collect content of a user action event, and send the information collected to an information filter and management module;

the information filter and management module, configured to receive content of the user action event from the information collection agent, maintain and manage the user interest data model in the user database according to the content received, and send a modification request to a modification module;

the modification module, configured to receive a modification request from the information filter and management module, modify the user interest data model according to the modification request.

It can be seen from the above technical scheme that in embodiments of the invention, a user interest data model is built, and an information collection agent collects information of a user action event when the user uses a browser or a document processor. Thus, the information concerned by the user is collected through the information collected, and the user interest data model may be modified continuously using the collected information concerned by the user. In this way, the interests and concerns of the user are effectively tracked. The invention features little disturbance to the user and accurate user information collected, and thus effectively shows the interest of the user.

DETAILED DESCRIPTION OF THE PREFERRED EMBODIMENTS

The embodiments of the invention build a user interest data model to store user interest data, collect content of a user action event when the user opens a browser or a document processor, and modify the user interest data model according to the content of the user action event collected.

The invention is hereinafter described in details with reference to the accompanying drawings and preferred embodiments to make the technical solution and merits thereof more apparent.

Figure 1:
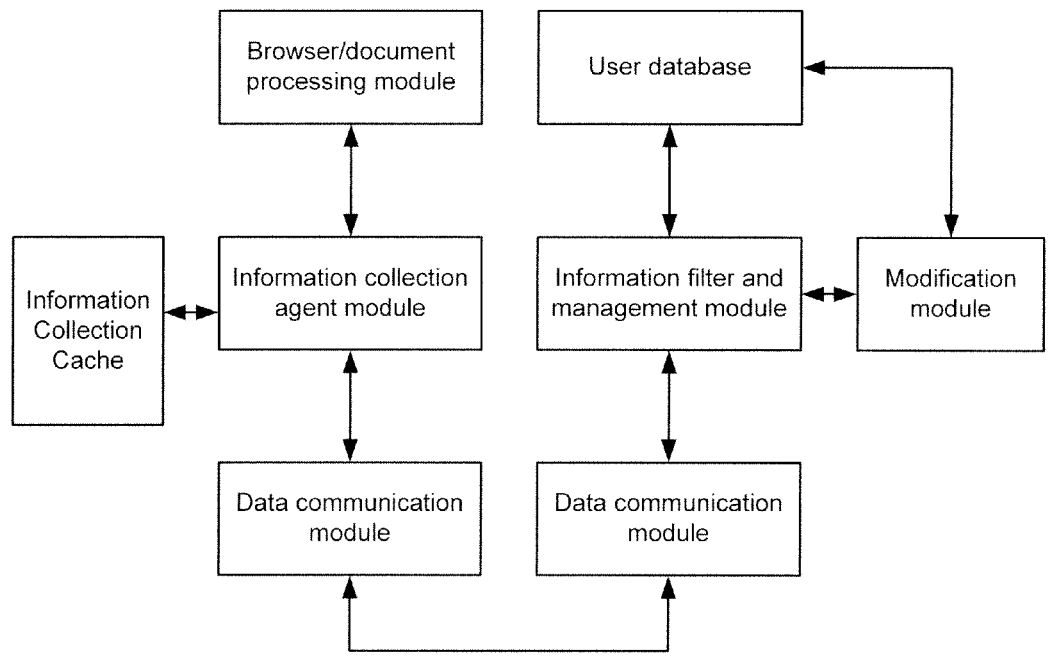
FIG. 1 is a schematic diagram illustrating a structure of a system for collecting user data according to an embodiment of the invention.

FIG. 1 is a schematic diagram illustrating a structure of a system for collecting user data according to an embodiment of the invention. As shown in FIG. 1, the system includes a browser/document processor, an information collection agent, an information filter and management module, a user database, and a modification module.

The browser/document processor is configured to execute a user action event when the user requires to browse or process a document, and to trigger the information collection agent to collect content of the user action event. The browser/document processor is a major tool for the user to browse and process documents. The browser/document processor receives an instruction from the user, executes the instruction, and sends action executed to the information collection agent via an event message. The browser/document processor may be different software components such as Internet Explorer (IE), Netscape, Firefox, Word, Adobe Reader, etc.

The information collection agent is configured to collect content of the user action event. The information collection agent receives the event message from the browser/document processor, collects content of the user action event according to the event message received, converts the format of the content of the user action event and analyzes the content of the user action event according to pre-configured event criteria, collect temporary data information concerned by the user, e.g., generates a temporary etyma table or a text file, etc., stores the temporary data information in an information collection cache; and sends the temporary data information to the information filter and management module.

The information filter and management module is configured to receive the temporary data information from the information collection agent, generate a system etyma table and store the system etyma table into the user database, maintain and manage, e.g., create, modify and delete, the user interest data model based on the system etyma table in the user database, and send a modification request to the modification module.

The user database is a core database of the whole system, configured to store the user interest data model and the system etyma table.

The modification module is configured to receive the modification request from the information filter and management module, modify the user interest data model according to the system etyma table in the user database, and return a modification response to the information filter and management module and update the user database according to the user interest data model modified.

The user interest data model, which is modified continuously along with the actions of the user, may track and reflect the interest and concerns of the user. An external system may obtain the interest of the user from the user database to provide better services for the user.

In addition, the system for collecting user interest data may be constructed in a distributive architecture. In such case, the system further includes a data communication module which is configured to communicate between the information collection agent and the information filter and management module. Mechanism and principle of the data communication module are based or existing distributive architecture technologies, e.g., Common Object Request Broker Architecture (CORBA), Web Services, etc., and will not be described herein.

In order to track the interest and concerns of the user, the information collection agent in the embodiment of the invention is triggered, according to the action of the user, e.g., browsing or processing a document, to collect the content of the user action event and store the content of the user action event collected into the user interest data model built in advance, and continuously modifies the user interest data model according to the content collected. In this way, the interest and concerns of the user are tracked effectively. The user interest data model may be built in the user database. The user interest data model includes many interest keywords which represent the interests of the user. Each keyword corresponds to a weight which shows the user's concern for the keyword. The collection of content of the user action event is usually triggered by a user action, e.g., clicking a hyperlink, attaching a bookmark, copying and pasting contents, scrolling a scroll bar, etc.

After the collection of the user action event, the information collection agent converts the format of the content collected. As different browser/document processors supports different data formats, the information collection agent converts the format of the content collected into an intermediate format supported by the information collection agent, e.g., an extensible Markup Language (XML) format, for centralized management. The information collection agent may also collect, for the centralized management, the content of the user action event by an Application Program Interface (API) hook function according to the user action and modify the format of the content collected by the API hook function to a text character format, thus the information collection agent need not convert the format of the collected content any more. Then the information collection agent analyzes the syntax and grammar of the content collected and generates a temporary etyma table; the information collection agent filters the temporary etyma table according to an etyma frequency statistic algorithm, and generates a system etyma table. The etyma frequency statistic algorithm is real-time and may reflect the current interest of the user at current time and shift of the interest of the user. The etyma frequency statistic algorithm will be described in detail hereinafter. Finally, the user interest data model is modified according to the system etyma table generated by the information collection agent, and the modification mainly includes: inserting keywords, deleting existing keywords and modifying weights of the keywords in the user interest data model.

Figure 2:
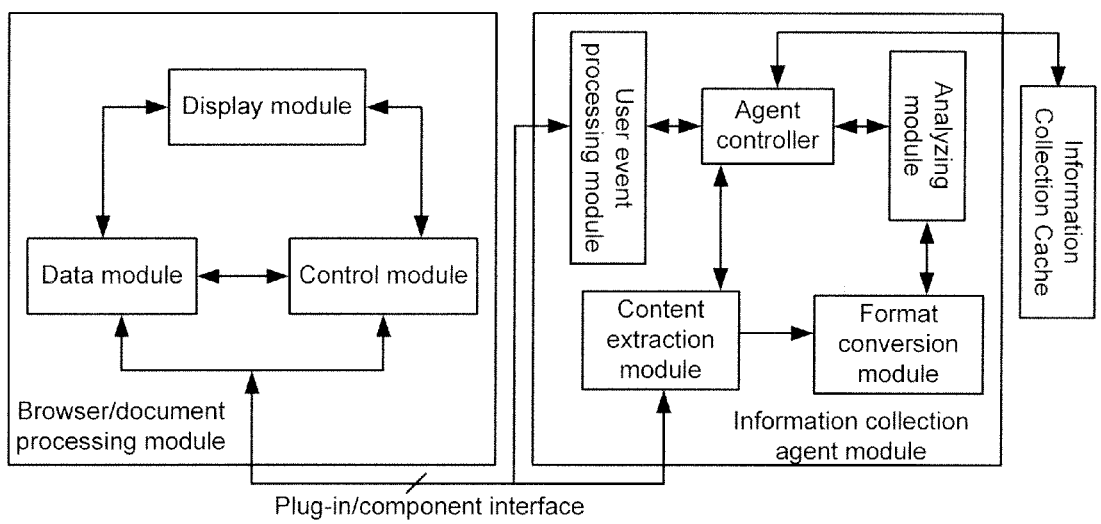
FIG. 2 is a schematic diagram illustrating structures of an information collection agent and a browser/document processor according to an embodiment of the invention.

FIG. 2 is a schematic diagram illustrating the structures of an information collection agent and a browser/document processor according to an embodiment of the invention. As shown in FIG. 2, the browser/document processor includes a data module, a control module and a display module. The information collection agent includes a user action event processing module, an agent controller, a content collection module, a format conversion module and an analyzing module. The information collection agent may be an independent software component, or a plug-in in the browser/document processor. There is no essential difference between the two forms of information collection agent. There is a plug-in/component interface between the browser/document processor and the information collection agent.

The structures and interaction principles of the browser/document processor and the information collection agent are described in details hereinafter.

Most of the current browser/document processors are designed based on a Model-View-Control (MVC) pattern, in which a browser/document processor may be divided into a data module, a display module and a control module. The data module is configured to execute application objects, e.g., data contents including documents and graphics. The display module displays the application objects under control of the control module. The control module controls all the modules in the browser/document processor to collaborate, including responding to a user action event, controlling response modes of the data module and the display module, etc.

The plug-in/component interface is a data interaction interface communicated between the information collection agent and the browser/document processor, e.g., a Component Object Model (COM) interface, which involves a software component technology put forward by Microsoft based on Windows applications.

The information collection agent includes the following components:

A user action event processing module, configured to receive an event message from the control module in the browser/document processor and return a response to the control module, filter the event message received and send the event message to be processed to an agent controller through an event notification;

The agent controller, configured to receive the event notification from the user action event processing module and return a event notification response to the user action event processing module; send an action content import request to a content collection module requesting to import the content of the user action event;

The content collection module, configured to receive the action content import request from the agent controller, send an OnRequest( ) message to the data module in the browser/document processor to obtain the content of the user action event, send the content obtained to a format conversion module or an analyzing module; and return an action content import response to the agent controller;

The format conversion module, configured to receive the content of a user action event from the content collection module, convert the format of the content into a pre-defined intermediate format and send the content converted to the analyzing module. It should be noted that, if the content of the user action event sent by the content collection module is in a text character format, the format conversion module is not required and the content sent by the content collection module is directly sent to the analyzing module.

The analyzing module, configured to analyze the syntax and grammar of the content received according to a pre-defined analysis method, collect temporary data information concerned by the user, e.g., generate a temporary etyma table or a text file, etc., and store the temporary data information into the information collection cache.

Figure 3:
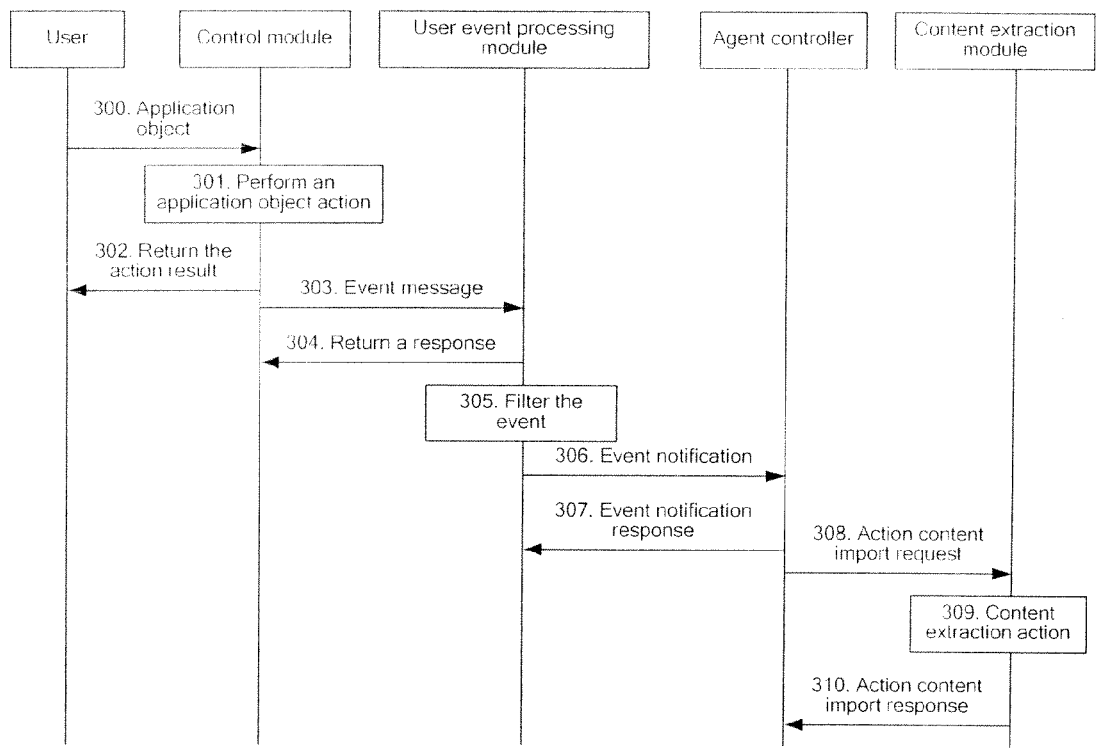
FIG. 3 is a flowchart of collecting user interest data according to an embodiment of the invention.

The foregoing are the structures and interaction principles of the browser/document processor and the information collection agent. Provided that the operation system adopted in the embodiments of the invention is the Windows operation system presented by Microsoft, the user action event processing module in the information collection agent listens to, through the plug-in/component interface, the event message in the control module of the browser/document processor. Once the user triggers a pre-configured event in the control module, the user action event processing module informs, through the agent controller, the content collection module to obtain content of the user action event. FIG. 3 is a flowchart illustrating the collection of the content of a user action event according to an embodiment of the invention. The process of collecting user interest data is hereinafter described with reference to FIG. 3.

Steps 300-302: the user executes an application object through the browser/document processor.

Suppose the application object is a document action, e.g., reading a document with the browser/document processor, including: Open( ), Cut( ), Copy( ), Paste( ), Forward( ), Back( ), etc. The control module executes the document action and returns an execution result to the user.

Steps 303-304: the control module sends an event message through a SendMessage( ) function to the user action event processing module, and the user action event processing module returns a response to the control module upon the receipt of the event message.

The SendMessage( ) function mainly includes the following parameters, as shown in Table 1:

Long SendMessage (Long ProcessID, Long Msg, Long Event, Hwnd ConObj, String Param), where Long stands for a long integer data type and String stands for a character data type.

TABLE 1

| Parameter | Description |
| --- | --- |
| ProcessID | A process identifier, used for identifying the process of the information collection agent which receives the event message |
| Msg | A message identifier, used for identifying the type of the event message |
| Event | An event identifier, used for identifying the event |
| ConObj | An application object handle, such as the address of the document object in the memory |
| Param | Extended Parameter |

As shown in Table 1, the browser/document processing module and the information collection agent are generally two independent processes. The parameters in the SendMessage( ) include the ProcessID of the process that receives the event message; Msg is used for identifying the type of the event message; Event is the identifier of the user action event customized by the browser/document processor and the information collection agent; ConObj is the application object handle, i.e., the address of the document object in the memory; and Param represents some extended parameters, such as Content offset, browsing elapsed time, etc.

Step 305: the user action event processing module filters the event message received.

The filter criteria are determined in accordance with pre-set events in the user action event processing module. It may be set through a customized User Interface (UI) that which event needs to be responded and whose content needs to be collected. The filter criteria may be set according to practical applications or be default events pre-set by the system.

Table 2 shows several API functions used for setting events.

TABLE 2

| API Function | Description |
| --- | --- |
| Long SetEvent(LongEvent[ ]) | setting an event |
| Long RemoveEvent(Long Event[ ]) | Removing a set event |
| Long[ ] QryEvent( ) | Querying a set event |

In Table 2, the parameter Event[ ] is of a predefined message type, which is similar to the message in the Windows operation system and is a common technique adopted by those skilled in the art and will not be explained herein. It should be noted that, the filter criteria, i.e., the events are set in the user action event processing module in advance to filter the event message received; if the event message received carries a pre-set event, proceed to the next step; otherwise, discard the event message.

Steps 306-307: the user action event processing module sends the event message to be processed to the agent controller through an event notification, and the agent controller returns an event notification response to the user event process module.

Steps 308-310: the agent controller sends an action content import request to the content collection module, and the content collection module returns an action content import response to the agent controller.

The agent controller obtains the handle of the application object and sends the handle and the process identifier of the application object to the content collection module; the content collection module sends, according to the handle and the process identifier received, an OnRequest( ) message to the data module in the browser/document processor to obtain the content of the user action event, The OnRequest( ) message includes:

Long OnRequest(Long ProcessID, Long Msg, Long Event, Hwnd ConObj, String Param, Hwnd WndProc)

TABLE 3

| Parameter | Description |
| --- | --- |
| ProcessID | A process identifier, used for identifying the process of the informalion collection agent which receives the event message |
| Msg | A message identifier, used for identifying the type of the message sent |
| Event | An event identifier, used for identifying the event |
| ConObj | An application object handle, such as the address of the document object in the memory |
| Param | Extended Parameter |
| WndProc | Handle of a callback function |

The content of the user action event may be collected in the following two ways:

1) collect the full content of the document object. The content collection module may obtain the document object directly and the format conversion module may convert the format of the document object into a standard intermediate format, such as the XML format;

2) collect the content of a specific user action, e.g., the content selected by a mouse during a click or copy action or during a mouse hovering time. In such case, the API hook function may be adopted. The process of collecting the content of the user action event by the hook function is described hereinafter taking the mouse hovering time as an example:

(1) obtain the cursor location of the mouse;
(2) generate a rectangle with the cursor as its center;
(3) install an API hook;
(4) the rectangle generates a re-paint message;
(5) wait in the API hook for outputted characters;
(6) calculate which text area the mouse hovers on and obtain the content in the area;
(7) remove the API hook if the content is obtained; it should be noted that the API hook shall be removed after a certain period of time no matter the content is obtained or not;
(8) send the content obtained to the content collection module.

All characters in the Windows system are outputted through two API functions, i.e., TextOut( ) and ExtTextOut( ). The two API functions are actions called by a Windows Graphic Device Interface (GDI) and are responsible for outputting characters in a Windows interface. In order to obtain all the characters outputted in the Window interface, a JMP instruction is added into the TextOut( ) function. The installation of the API hook function described in the above step (3) is actually a process of adding a JMP instruction in the Windows API function to jump to an appointed address, so that the characters outputted may be obtained.

The collection of the content of a Copy action is described hereafter with reference to an embodiment of the invention in which the Windows system is adopted.

First, configure filter criteria through the API function. Provided that the value of the Copy action event is 10001011, set a Copy action event in the user action event processing module through calling the SetEvent(UE_COPY) function in existing API functions, where the UE_COPY is the macro definition of 1000011.

When browsing a document, the user puts what he concerns into the clipboard through a Copy (Ctrl+C) action, the browser/document processor responds to the Copy action and calls the function SendMessage(1964, WM_OPER, UE_COPY, con_hdc, NULL) to send, via the plug-in/component interface, an event message to user action event processing module in the information collection agent. The WM_OPER is the macro definition of operation system message definition and the con_hdc is a pointer pointing to the content copied.

Since the Copy action event has been set in the user action processing module, the user action event processing module filters the event carried in the event message and sends an event notification to the agent controller. Upon the receipt of the event notification, the agent controller requests the content collection module to collect the content of Copy action. Then the content collection module calls the API functions to obtain the content of Copy action. The process of obtaining the content of the Copy action, i.e., the content in the clipboard, using the Windows API functions is an existing Window application programming technique and will not be explained herein.

After the collection of the content shown in FIG. 3, the format conversion module converts the format of the content collected and performs a syntax and grammar analysis.

The process of format conversion, i.e., the conversion of the format of the content collected into a pre-defined intermediate format, has already been explained in the fore-going description and will not be repeated herein. Whichever method is adopted, the system always gets the content in a text character format. The analyzing module performs a word segmentation for the content of the user action event, generates a temporary etyma table, stores the temporary etyma table into the information collection cache, and generates a system etyma table based on the temporary etyma table.

Figure 4:
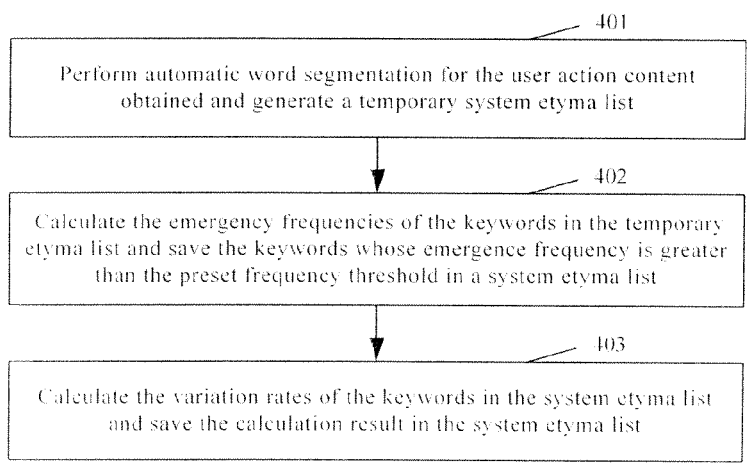
FIG. 4 is a flowchart of generating a system etyma table according to an embodiment of the invention.

FIG. 4 is a flowchart of generating a system etyma table according to an embodiment of the invention. As shown in FIG. 4, the generation of the system etyma table through the syntax and grammar analysis includes the following steps.

Step 401: perform an automatic word segmentation for the content obtained in the text character format, generate temporary keywords and store the temporary keywords into a temporary etyma table.

The automatic word segmentation is an existing technique, including binary segmentation algorithm, word-table segmentation algorithm, etc. The details of the automatic word segmentation algorithms may be obtained from relevant references and will not be described herein. A frequently used automatic word segmentation algorithm is a binary segmentation algorithm which is applicable for Chinese and other Asian languages such as Korean and Japanese.

The keywords refer to the strings that frequently appear in the content obtained. For example, set a frequency threshold in advance, and a string is determined to be a keyword if the emergence frequency of the string is greater than the frequency threshold. A keyword has to be a notional word with a meaning, such as football, etc. While conjunctions, prepositions and modals, such as too, also, to, etc., are not suitable to be keywords.

Step 402; calculate the emergence frequency of each keyword in the temporary etyma table and store the keyword whose emergence frequency is greater than the preset frequency threshold into a system etyma table.

Step 403: Calculate the variation rate of each keyword in the system etyma table and store the calculated result into the system etyma table.

The variation rate of keyword well reflects the shift of user's concern on the keyword. The decrease of the variation rate indicates that the user pays less attention to the keyword while the increase of the variation rate indicates that the user pays more attention to keyword. If the variation rate of a keyword is kept low or nearly zero for a long time, it indicates that the user may no longer pay attention to the keyword. The variation rate of a keyword may be calculated through Equation 1:

Variation rate of a keyword=$dFi/dt$ (1) Where Fi is the emergence frequency of the keyword i, and the variation rate of the keyword i is the differential coefficient of the emergence frequency of the keyword i to time.

Table 4 shows a temporary etyma table, and Table 5 shows a system etyma table.

TABLE 4

| | Keywords | | | |
|---|---|---|---|---|
| | Playstation | Basketball | ... | Golf |
| Frequency | 3 | 5 | ... | 1 |

TABLE 5

| | Keywords | | | |
|---|---|---|---|---|
| | Playstation | Basketball | ... | Golf |
| Frequency | 100 | 200 | ... | 20 |
| Variation Rate | 5 | 10 | ... | 3 |

The variation rate in the system etyma table obtained through the Equation 1, is real-time and reflects the variation of the etymons that the user is interested in.

Figure 5:
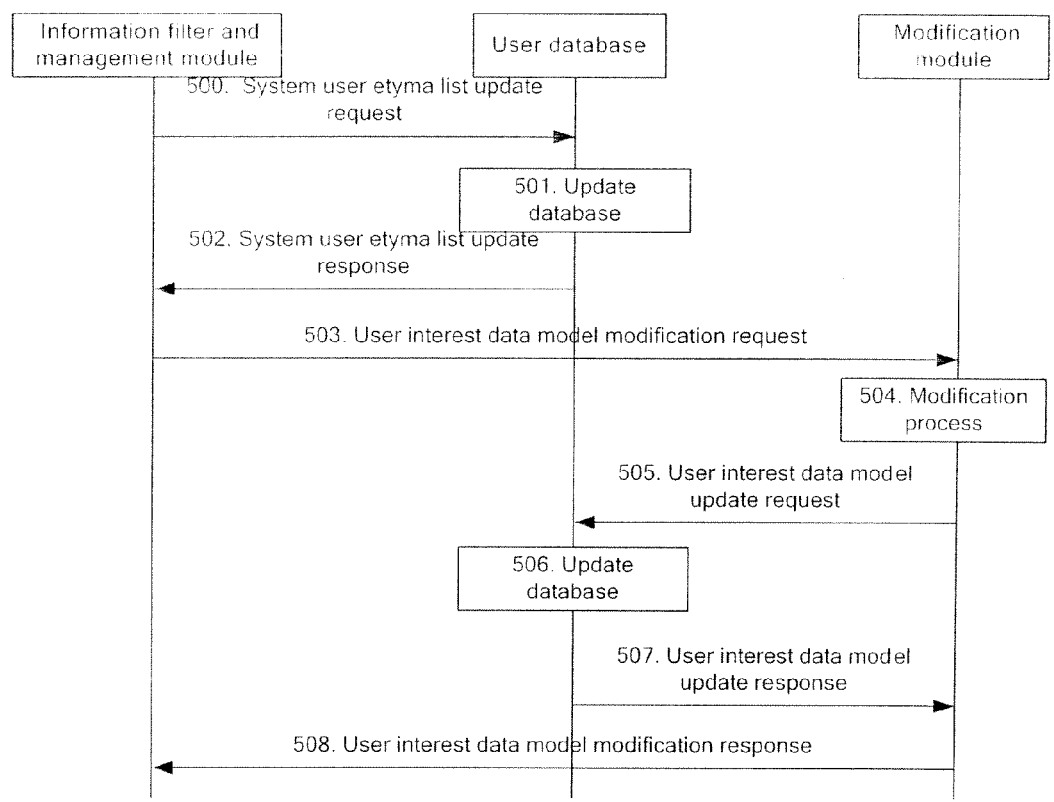
FIG. 5 is a flowchart of modifying the user interest data model according to an embodiment of the invention.

The information filter and management module maintains and manages the system etyma table, and modifies in cooperation with the modification module, the user interest data model based on the system etyma table. FIG. 5 is a flowchart of modifying the user interest data model according to an embodiment of the invention, includes the following steps.

Step 500: the information filter and management module sends a system etyma table update request to the user database.

The information filter and management module store the results calculated in steps 402 and 403 into the system etyma table to update the system etyma table.

Step 501: the user database updates the system etyma table according to the system etyma table update request.

Step 502: the user database returns a system etyma table update response to the information filter and management module, indicating that the update has been completed.

Step 503: the information filter and management module sends a user interest data model modification request to the modification module.

The user interest data model modification request carries the event identifier of the user action event and information of the updated etyma in the system etyma table.

The user interest data model may be modified upon the trigger of a pre-determined event, e.g., modify the user interest data at a pre-determined time. In such case, the system stores the identifier of the keyword imported into the system etyma table in each modification process.

The user interest data model may also be modified based on the collection of content of the user action event. In such case, the information filter and management module needs to carry the event identifier of the user action event in the user interest data model modification request, and send the user interest data model modification request to the modification module.

The basic storage structure of the user interest data model is shown in Table 6. As shown in Table 6, the Keyword Identifier/Index field stores the identifier of the keyword imported into the system etyma table, the modification identifier is used to distinguish different modification operations. The event identifier records the identifier of the user action event.

TABLE 6

| Modification Identifier | Keyword Identifier/Index | Event Identifier |
|---|---|---|
| ModID1 | WordID1 | EventID1 |
| ModID1 | WordID1 | EventID2 |
| ... | ... | ... |
| ModID3 | WordID2 | EventID1 |
| ... | ... | |

Step 504: the modification module modifies the user interest data model.

The modification of the user interest data model mainly includes inserting a keyword, and/or deleting an existing keyword, and/or modifying the weight of a keyword. The modification is described hereafter with reference to an embodiment in which the user interest data model is modified in real time based on the collection of content of a user action event.

When the user interest data model is modified based on the collection of content of the user action event, besides the emergence frequency and variation rate of keyword, the influences of user action event, such as reading time (bt), inserting a bookmark (bm), scrolling a scrollbar (sc) and following a hyperlink (fl), etc., need to be considered. The calculation involved in the modification is shown in Equation 2:

$$R_i = \sum_{v \in F} c_v f_v(i) \qquad (2)$$

where F is a set of user actions including reading time (bt), inserting a bookmark (bm), scrolling a scrollbar (sc) and following a hyperlink (fl), i.e., F={fl,bm,sc,fl}; $c_v$ is the weight assigned to the user action event v, and v is a mathematical symbol standing for a user action event. i stands for a keyword, $R_i$ is the weight of the keyword i corresponding to the user action event v, and is used in update of the user interest data model; and $f_v(i)$ is a two-value function of the keyword i. When the user performs an action on keyword i, the value of the $f_v(i)$ is 1, otherwise the value of the $f_v(i)$ is 0.

a modification weight $W_P^{(i)}$ may be calculated out based on $R_i$ and the modification weight $W_P^{(i)}$ is used to update the user interest data model, as shown in Equation 3:

$$W_P^{(i)} = f\left(F_i, \frac{dF_i}{d_i}, R_i\right) \qquad (3)$$

Equation 3 is a function used for calculating the modification weight of the keyword i, i.e., calculating the modification weight of the keyword i based on the emergence frequency, the variation rate and weight obtained through Equation 2.

In Equation 3, $W_P^{(i)}$ is the modification weight of the keyword i, $F_i$ and $$\frac{d_{Fi}}{d_t}$$

is the emergence frequency and variation rate of the keyword i. $W_P^{(i)}$ is a function of $F_i$, $$\frac{d_{Fi}}{d_t}$$

and $R_i$. The modification includes: if the modification weight $W_P^{(i)}$ of the keyword i is larger than a highest weight threshold set in advance, the weight of the keyword i in the user interest data model is increased; if the modification weight $W_P^{(i)}$ of the keyword i is between the highest and lowest weight thresholds, it indicates that the weight of the keyword i is basically the same as that in the user interest data model, the weight of the keyword i in the user interest data model is kept unchanged; and if the modification weight $W_P^{(i)}$ of the keyword i is smaller than the given lowest weight threshold, the weight of the keyword i in the user interest data model is decreased. The lowest weight threshold of the keyword in the user interest data model may be adjusted to avoid excessive keywords in the user interest data model, so as to maintain the user interest data model properly.

Table 7 shows a 2-dimensional table illustrating a storage structure of the user interest data model, includes user identifier, keyword and weight of the keyword. The weight of the keyword shows the continuous modification of the user interest data model and the extent that the user concerns on a keyword.

TABLE 7

| User Identifier | Keyword | Weight |
|---|---|---|
| UID1 | Basketball | 95 |
| UID1 | Playstation | 65 |
| UID1 | Golf | 30 |
| ... | ... | ... |
| UID2 | Football | 70 |
| ... | ... | ... |

Step 505: the modification module sends a user interest data model update request to the user database.

The user interest data model update request carries information of the user interest data model modified.

Step 506: the user database updates the user interest data model according to the user interest data model update request.

Step 507: the user database returns a user interest data model update response to the modification module.

Step 508: the modification module returns a user interest data model modification response to the information filter and management module.

The embodiments of the invention effectively track the interest and concerns of the user through continuous modification of the user interest data model by the content of a user action event collected. Furthermore, the embodiments of the invention feature little disturbance to users and accurate collection of user information, and thus effectively shows the interest of the user.

The foregoing is only the preferred embodiments of the invention and is not for use in limiting the invention, any modification, equivalent replacement or improvement made under the spirit and principles of this invention is included in the protection scope of the invention.

What is claimed is:

1. A method for collecting user interest data, wherein the user interest data is stored in a user interest data model, the method comprising:

receiving, by an information collection agent, an event message carrying a user action event;

collecting, by the information collection agent, the content of the user action event according to the event message; and modifying, by a modification module, the user interest data model which stores the user interest data according to the content of the user action event, wherein the modifying the user interest data model according to the content of the user action event comprises performing an automatic word segmentation for the content of the user action event, obtaining temporary keywords of the content and storing the keywords in a temporary etyma table, selecting a keyword from the temporary etyma table, saving the keyword selected into a system etyma table, and modifying the user interest data model according to the system etyma table, wherein the selecting a keyword from the temporary etyma table comprises selecting the keyword if an emergence frequency of the keyword is higher than a frequency threshold set in advance; and wherein the modifying the user interest data model according to the system etyma table comprises calculating a modification weight for each keyword in the system etyma table following a first equation expressed as $$W_P^{(i)} = f\left(F_i + \frac{d_{Fi}}{d_t} + R_i\right)$$

and modifying the user interest data model according to the modification weight, wherein $W_P^{(i)}$ is the modification weight of keyword i, $F_i$ and $$\frac{d_{Fi}}{d_t}$$

are an emergence frequency and a variation rate of the keyword i, respectively, and $R_i$ is a weight of the keyword i corresponding to the user action event.

2. The method of claim 1, wherein the user interest data model comprises:

a user identifier; a keyword; and a weight of the keyword.

3. The method of claim 1, further comprising:

determining whether the user action event matches a filter criteria set in advance.

4. The method of claim 3, wherein the process of collecting the content of the user action event according to the event message comprises at least one of:

obtaining full text of a document object of the user action event; and obtaining the content of a specific user action event through an Application Programming Interface (API) hook function.

5. The method of claim 1, further comprising:

converting the content into a text character format.

6. The method of claim 1, wherein the automatic word segmentation comprises any one of an automatic binary segmentation algorithm and a word-table segmentation algorithm.

7. The method of claim 1, wherein $R_i$ is calculated following a second equation expressed as:

$$R_i = \sum_{v \in F} c_v f_v(i).$$

8. The method of claim 1, wherein the process of modifying the user interest data model according to the modification weight comprises:
   increasing the weight of the keyword in the user interest data model if the modification weight of the keyword exceeds a highest weight threshold set in advance; and
   decreasing the weight of the keyword in the user interest data model if the modification weight of the keyword falls below a lowest weight threshold set in advance.

9. A system for collecting user interest data, comprising:
   a user database, configured to store a user interest data model;
   an information collection agent, configured to receive an event message carrying a user action event and collect content of the user action event according to the user action event, to perform an automatic word segmentation for the content of the user action event, to obtain temporary keywords of the content and store the keywords in a temporary etyma table, to select a keyword from the temporary etyma table if an emergence frequency of the keyword is higher than a frequency threshold set in advance, and to save the keyword selected into a system etyma table;
   an information filter and management module, configured to receive the content of the user action event from the information collection agent, maintain and manage the user interest data model in the user database according to the content of the user action event; and
   a modification module, configured to receive a modification request from the information filter and management module, configured to calculate a modification weight for each keyword in the system etyma table following a first equation expressed as $$W_P^{(i)} = f\left(F_i + \frac{d_{Fi}}{d_t} + R_i\right),$$

and configured to modify the user interest data model according to the modification weight, wherein $W_P^{(i)}$ is the modification weight of keyword i, $F_i$ and $$\frac{d_{Fi}}{d_t}$$

are an emergence frequency and a variation rate of the keyword i, respectively, and $R_i$ is a weight of the keyword i corresponding to the user action event.

10. The system of claim 9, further comprising: an information collection cache, configured to store the content of the user action event collected by the information collection agent.

11. The system of claim 9, further comprising: a browser/document processor, configured to execute a user action event, and a trigger the information collection agent to collect content of the user action event.

12. The system of claim 11, wherein the browser/document processor is further configured to receive an action content request and a response from the information collection agent, provide the content of the user action event and sends an event message to the information collection agent.

13. The system of claim 12, wherein the information collection agent is further configured to convert the data format into a predetermined intermediate format and send the data converted by the information collection agent to the information filter and management module.

14. The system of claim 9, wherein the information collection agent and the browser/document processor interact to exchange data through a plug-in/component interface.

* * * * *